US008683268B2

(12) United States Patent  
Chen et al.

(10) Patent No.: US 8,683,268 B2  
(45) Date of Patent: Mar. 25, 2014

(54) KEY BASED CLUSTER LOG COALESCING

(75) Inventors: James Newman Chen, Austin, TX (US); Christopher Verton Lenfest, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/164,717

(22) Filed: Jun. 20, 2011

(65) Prior Publication Data

US 2012/0324290 A1 Dec. 20, 2012

(51) Int. Cl.
*G06F 11/00* (2006.01)

(52) U.S. Cl.
USPC ....................................... 714/38.13

(58) Field of Classification Search
USPC ............................. 714/37; 717/128
See application file for complete search history.

(56) References Cited

U.S. PATENT DOCUMENTS

| | | | |
|---|---|---|---|
| 6,854,069 B2 | 2/2005 | Kampe et al. | |
| 7,359,831 B2 | 4/2008 | Shrivastava et al. | |
| 7,624,118 B2 | 11/2009 | Schipunov | |
| 7,721,152 B1 | 5/2010 | Joshi et al. | |
| 2005/0289514 A1 | 12/2005 | Hooper et al. | |
| 2008/0162272 A1* | 7/2008 | Huang et al. | 705/11 |
| 2009/0164979 A1* | 6/2009 | Fischer | 717/128 |
| 2009/0164980 A1 | 6/2009 | Rossman et al. | |
| 2011/0067008 A1 | 3/2011 | Srivastava et al. | |

OTHER PUBLICATIONS

Caromel, D. (Aug. 2009). ProActive Parallel Suite: Multi-cores to Clouds to Autonomicity. IEEE 5th International Conference on Intelligent Computer Communication and Processing, (ICCP 2009), pp. xi-xii, 27-29. DOI: 10.1109/ICCP.2009.5284792.

Zhang, Z. J. et al. (Dec. 2009). A parallel debugger based on cluster operating system using B/S structure. 2009 WRI World Congress on Software Engineering, WCSE 2009, P3570 3/-(148-151).

* cited by examiner

*Primary Examiner* — Michael Maskulinski
*Assistant Examiner* — Neil Miles
(74) *Attorney, Agent, or Firm* — VanLeeuwen & VanLeeuwen; Matthew B. Talpis (57) ABSTRACT

An approach is provided to trace a software program running in a multi-nodal complex computing environment. A trace request is sent from a requestor node to the nodes with the trace request associated with the software program and also associated with a transaction identifier. The software program is executed on the nodes. While the program is executing, trace data entries resulting from the execution of the software program are logged at the respective nodes with each trace data entry being associated with the transaction identifier. A log request is subsequently sent from the requestor node to the other nodes. The resulting trace data is then received by the requestor node from the target nodes and logged in a transaction based log. The transaction-based log is then provided to a user of the requestor node.

20 Claims, 5 Drawing Sheets

KEY BASED CLUSTER LOG COALESCING

BACKGROUND

The present disclosure relates to an approach that generates a transaction, or key, based trace log for a process running on a number of computer system nodes in a cluster environment.

In computer programming, tracing is a use of logging to record information about a program's execution. This information is typically used by programmers for debugging purposes. When working in a complex computing environment such as a cluster, it may be valuable for performance or debugging reasons to see logs that are centered around a transaction rather than those that are based on a machine, or based on time. Under normal circumstances, it may be difficult to trace a transaction running on multiple computer systems, or machines. Even if all logging is fully gathered on each machine, it can be difficult to identify where handoffs occur. Multi-threaded programs can add another layer of complexity as the user may see logs from different threads interleaved with one another.

BRIEF SUMMARY

An approach is provided to tracing a software program running in a multi-nodal complex computing environment. A trace request is sent from a requestor node to the other nodes. The trace request is associated with the software program and also associated with a transaction identifier. The software program is executed on the nodes. While the program is executing, trace data entries resulting from the execution of the software program are logged at the respective nodes with each trace data entry being associated with the transaction identifier. A log request is subsequently sent from the requestor node to the other nodes. The resulting trace data is then received by the requestor node from the target nodes and logged in a transaction based log. The transaction-based log is then provided to a user of the requestor node.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
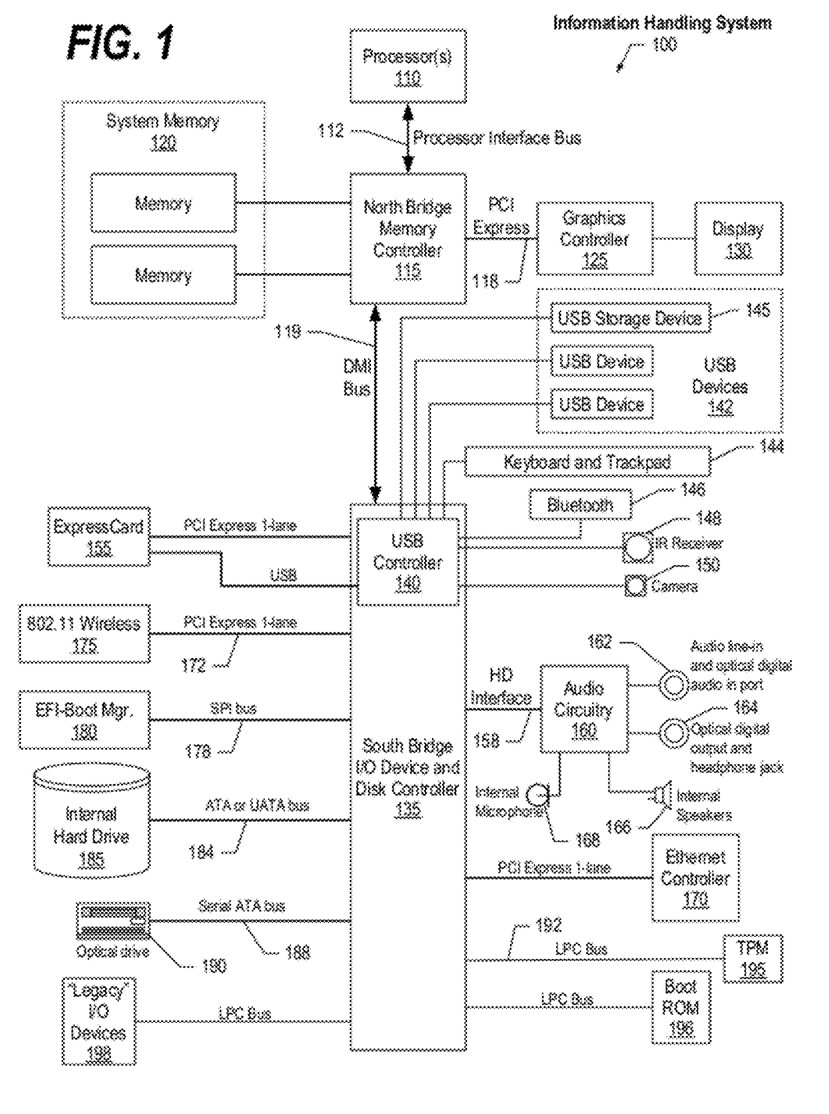
FIG. 1 is a block diagram of a data processing system in which the methods described herein can be implemented.
Figure 2:
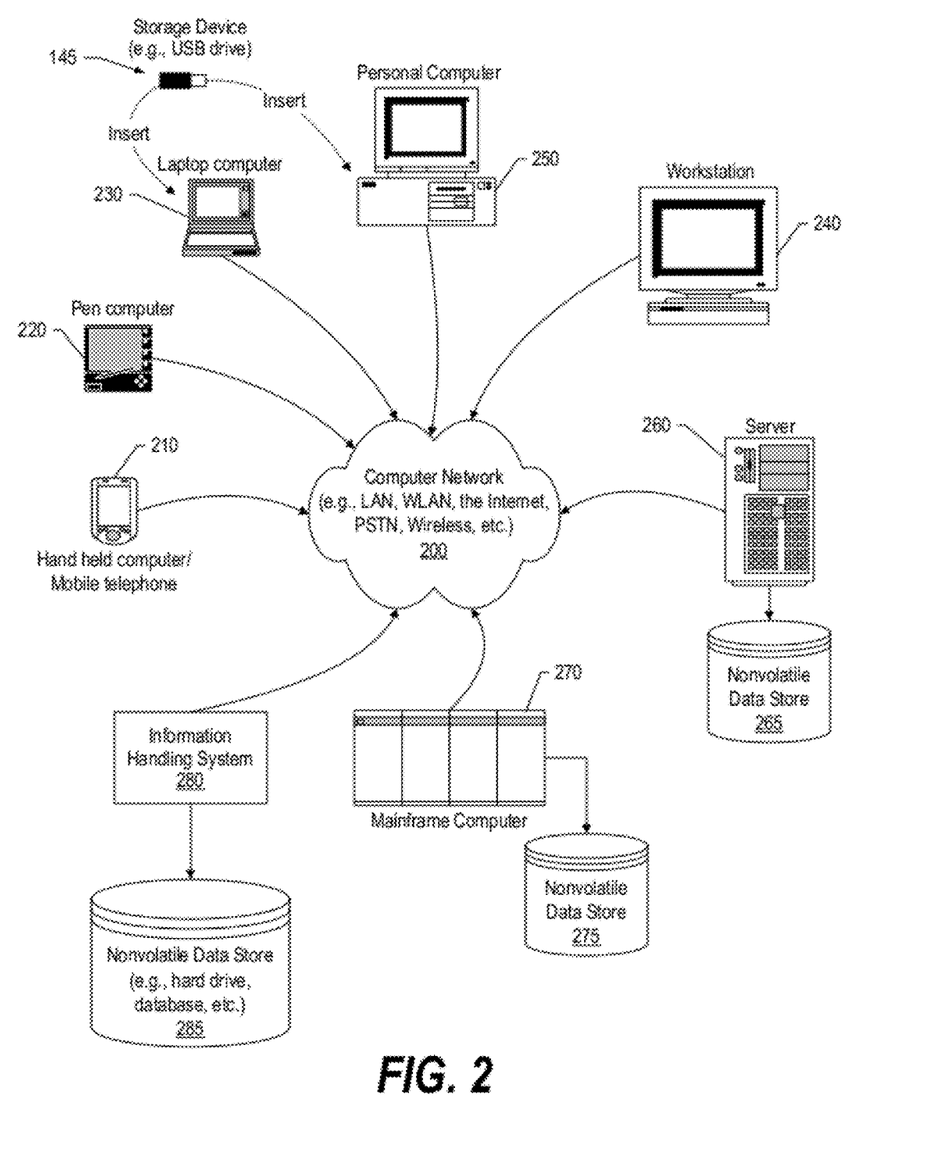
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems.

Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
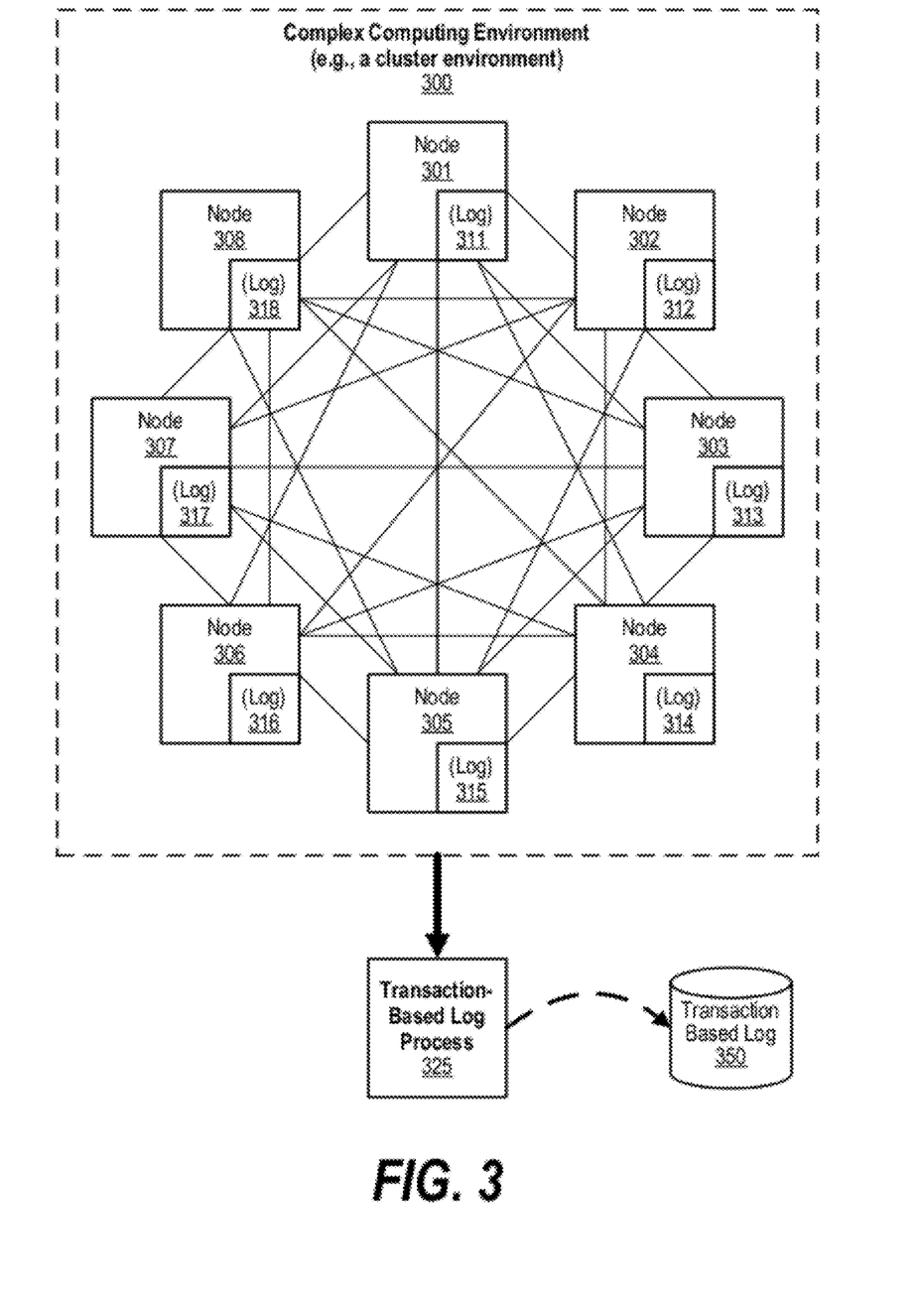
FIG. 3 is a diagram showing an example complex computing environment, such as a cluster, with a single transaction based log based on data gathered from each of the individual machine-based logs.

FIG. 3 is a diagram showing an example complex computing environment, such as a cluster, with a single transaction based log based on data gathered from each of the individual machine-based logs. Complex computing environment 300 includes a number of nodes (301, 302, 303, 304, 305, 306, 307, and 308). Each node is an information handling system that includes one or more processors and a memory. In addition, each node includes one or more communication interfaces that connect each node to one or more other nodes in complex computing environment 300, such as that found in a cluster environment. In the example shown in FIG. 3, each node is connected to all of the other nodes with a communication interface.

One of the nodes is being used by a user to trace a software program that executes simultaneously on all of the nodes. This node is referred to as the "requestor node" as it is the node that requests the trace and also requests the resulting trace logs. For example, if node 301 is being used by the user than node 301 would be the requestor node. The software program includes various processes and functions, some of which might be running in one of the nodes, while others are running in other nodes. In one embodiment, the clocks on all of the nodes are synchronized using techniques appreciated by those skilled in the art prior to tracing so that the timestamps returned with the logged trace data entries follow a consistent time of day.

The trace request is sent from the requestor node to the set of nodes. The trace request is associated with the software program and includes a transaction identifier. Upon receiving the trace request, each of the nodes (nodes 301 through 308) start tracing the identified program and gathering the identified trace data. The nodes accomplish this by identifying each of the processes and functions associated with the program that is being traced and set breakpoints at the functions. In one embodiment, for example when the nodes are using a ptrace( ) system call, the nodes are able to trace a program that is already running on the nodes. Trace data entries result when the breakpoints are hit while the program is being executed. For each node, the trace data entries are logged (stored) in that node's memory area for later retrieval. In the example shown, log memory areas 311 through 318 are used to log trace data entries that are generated by the trace that is being performed on the respective node. For example, trace data entries (results) generated on node 301 are logged in memory area 311, results generated on node 302 are logged in memory area 312, etc.

Periodically, the requesting node sends a log request to each of the nodes using transaction based log process 325. The log request includes the transaction identifier. Each of the nodes (301-308) retrieves the logged trace data entries that are associated with the transaction identifier from their local memory areas (311-318) and returns the logged trace data entries to the requestor node (e.g., node 301, etc.). The transaction based log process combines the logs received from the various nodes and creates transaction based log 350. In one embodiment, the transaction based log includes the transaction identifier, a node identifier, and a timestamp associated with each of the logged data entries. A user can now review the transaction based log and determine what events occurred when and on what node.

The user (requestor node) specifies a list of nodes, processes, functions, key, and arguments to log. Using a format of:
 "Node:process_name:func:key:arg1:arg2: . . . :argN",
 A sample tracing scenario could look something like:

---
\*:proc1:foo:transaction_id:ptr->user:ptr->priority
nodeA:proc2:bar:ptr->transaction_id:global_var_1
nodeB:proc2:baz:ptr->transaction_id:global_var_2
---

Next, the system would start monitoring (tracing) the processes on all nodes in the cluster (note the use of * as a wildcard for the nodes that are monitored for prod in the sample and the two nodes (nodeA and nodeB) are tracing different data elements within proc2. Note there can be multiple processes monitored on each node. Once these processes are kicked off, they will set breakpoints in the identified functions. In the example, there are three functions—"foo" corresponding with process prod and "bar" and "baz" corresponding with process proc2. In one embodiment, the breakpoints are set across the two separate process types using the ptrace( ) system call. When a breakpoint is hit, we log the key, timestamp, and any arguments specified and then continue the process.

While the processes are running, or once they complete, the user can start a process that will retrieve the logs from all nodes across the cluster. The user can see a list of all the transactions that have occurred in the cluster, and the user can utilize a Graphical User Interface (GUI) that will be updated in real time as the workload runs. An example of the display of the transaction-based log is as follows:

+TID 4006

− TID 4007

− 08/04/2010 16:11:32 − Node:*initiatorNode*,

*func:foo, ptr* → user:root, *ptr* → priority:1

− 08/04/2010 16:11:33 − Node:*nodeA*,

*func*:bar, global_var_1:"Hello"

− 08/04/2010 16:11:37 − Node:*nodeB*,

*func:baz*, global_var_2:"Here"

+ TID 4008

In the above example, three transaction identifiers (TID) are shown. The plus signs (+) to the left of TID 4006 and TID 4008 indicate that the logs for these transaction identifiers have been visibly collapsed (not visible). If the user selects the TID, then the logged data entries are displayed as shown for TID 4007. Note that following TID 4007, three logged trace data entries have been retrieved. At 16.11.32, the "initiatorNode" (requestor node) logged a trace data entry; at 16:11:33, nodeA logged another trace data entry; and at 16:11:37, nodeB logged a trace data entry. Despite the fact that the trace data entries were logged on different nodes they are organized by timestamp and available for viewing by the user.

Figure 4:
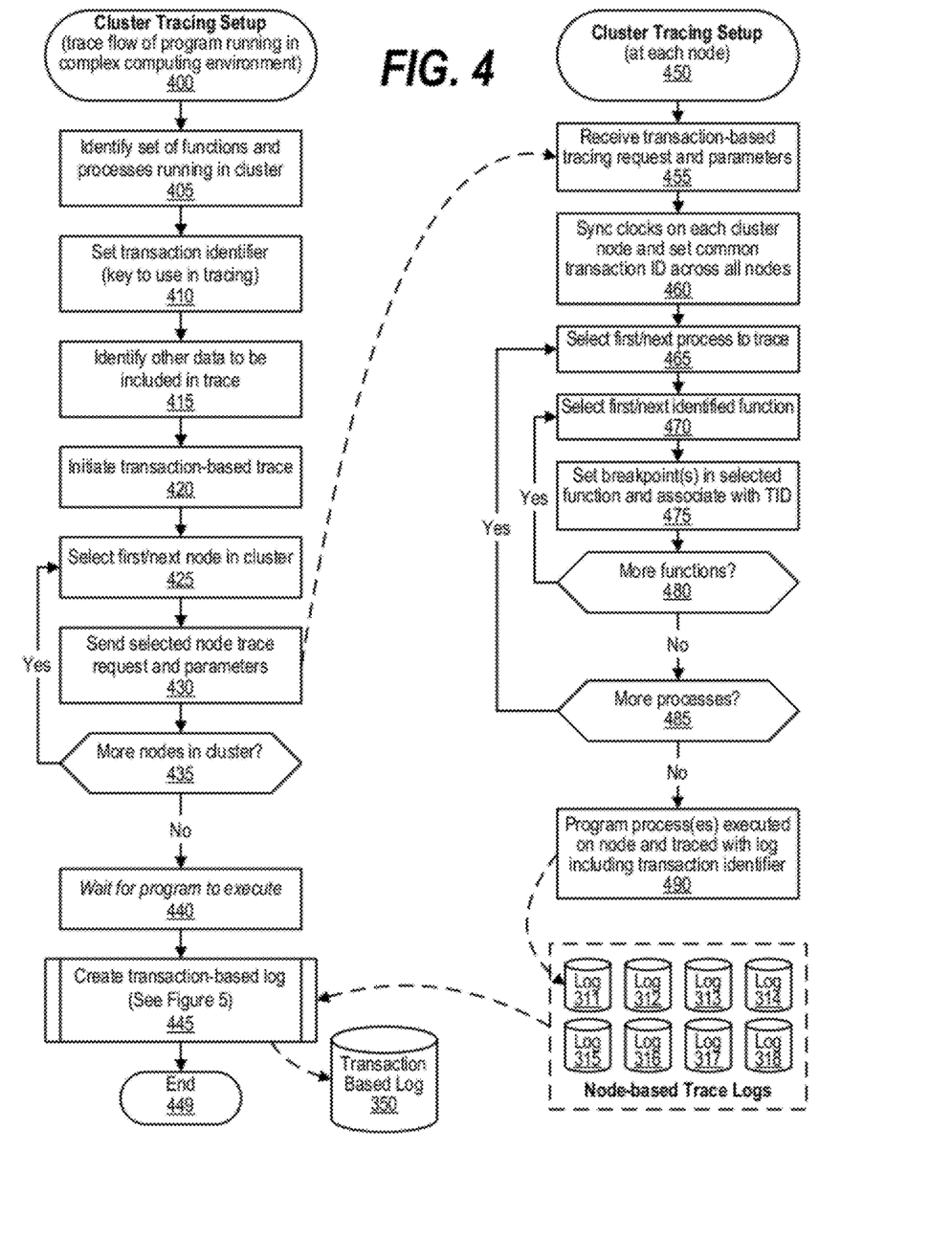
FIG. 4 is a flowchart showing steps taken to setup cluster tracing by the user's node and each of the nodes where the user's program is executing.

FIG. 4 is a flowchart showing steps taken to setup cluster tracing by the user's node and each of the nodes where the user's program is executing. Processing at the requestor node commences at 400 with a user that desires to trace the flow of a program in the complex computing environment. At step 405, the user identifies the set of processes and function that are desired for tracing. At step 410, a transaction identifier is established as a common key across all of the nodes that will be used to group the trace results by transaction irregardless of the node on which the results were obtained. In one embodiment, the transaction identifier is a number that is incremented and kept in sync by each of the nodes so that each node is using the same transaction number. In another embodiment, the transaction identifier can be user specified. At step 415, the data elements (e.g., registers, variables, etc.) to be traced are identified by the user. At step 420, the transaction-based trace of the software program is initiated.

At step 425, a first node from the cluster is selected and, at step 430, the selected node is sent the trace request that includes the processes being traced, the functions being traced, and the data elements being traced. Note that the requestor node can also be one of the selected nodes where tracing is performed. A decision is made as to whether there are more nodes in the cluster (decision 435). If there are more nodes in the cluster, then decision 435 branches to the "yes" branch which loops back to select the next node in the cluster and send the newly selected node the trace request. This looping continues until all of the nodes have been sent the trace request, at which point decision 435 branches to the "no" branch whereupon, at step 440, the user waits for the program to execute (e.g., until completion, for a period of time, etc.). At predefined process 445, transaction-based log 350 is created (see FIG. 5 and corresponding text for processing details). The user is now able to view and organize the trace results using transaction-based log 350 by the transaction identifier. Processing by the requestor node thereafter ends at 449.

Turning now to the processing performed at each of the nodes, processing commences at 450 whereupon, at step 455, the node receives the transaction-based tracing request along with the tracing parameters (processes being traced, the functions being traced, and the data elements being traced, etc.). At step 465, the first process that is being traced is selected and at step 470, the first function within the selected process is selected. At step 475, a breakpoint is set in the selected function and associated with the transaction identifier (TID). In one embodiment, the breakpoints are set using a ptrace( ) system call. A decision is made as to whether there are more functions in the selected process to trace (decision 480). If there are more functions in the selected process to trace, then decision 480 branches to the "yes" branch which loops back to select the next function and set a breakpoint in the newly selected function. This looping continues until there are no more functions to trace in the selected process, at which point decision 480 branches to the "no" branch whereupon a decision is made as to whether there are more processes that are being traced (decision 485). If there are more processes that are being traced, then decision 485 branches to the "yes" branch which loops back to select the next process whereupon the functions in the newly selected process are each selected and breakpoints are set as described above. This looping continues until there are no more processes to be traced, at which point decision 485 branches to the "no" branch whereupon, at step 490, the program is executed by the various nodes with logs maintained at each node (logs 311 through 318) corresponding with the tracing that was performed by each individual node using the given trace parameters.

Figure 5:
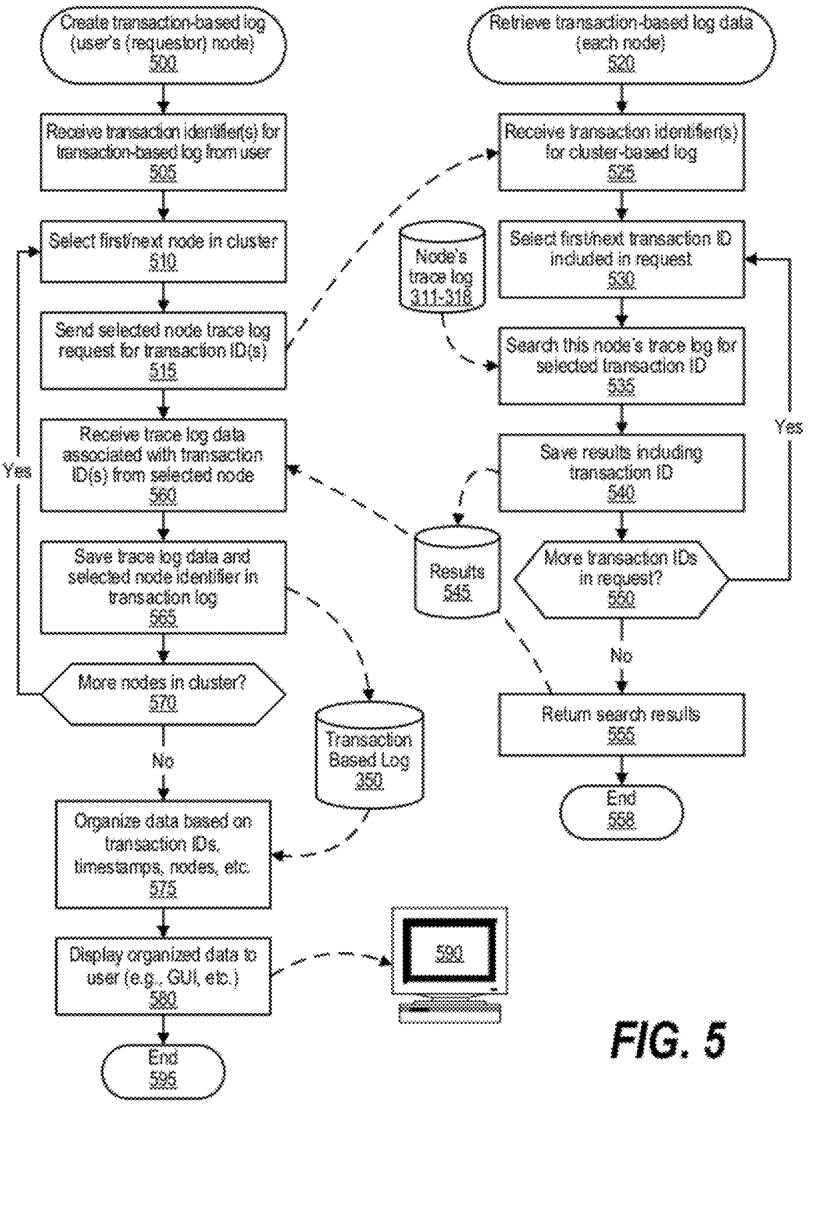
FIG. 5 is a flowchart showing steps taken by the user to generate the transaction-based log using a process that gathers the log data from each of the individual nodes in the cluster.

FIG. 5 is a flowchart showing steps taken by the user to generate the transaction-based log using a process that gathers the log data from each of the individual nodes in the cluster. Processing at the requestor node commences at 400 with a user that desires to view the logged trace data entries corresponding to a program that was executed and traced in the complex computing environment. In one embodiment, at step 505, the user enters one or more transaction identifiers that corresponding to logged trace data entries that the user wishes to view. At step 510, the first node in the cluster is selected and, at step 515, a log request is sent from the requestor to the selected node for the node's trace log. In one embodiment, the request includes one or more transaction identifiers of interest to the user. Note that the requestor node can also be one of the selected nodes where tracing is performed and from which log results are requested.

Processing performed by each of the nodes is shown commencing at 520 whereupon, at step 525, the node receives the log request from the requestor. In one embodiment, as mentioned above, the log request includes one or more transaction identifiers that corresponding to logged trace data entries that are to be returned to the requestor. At step 530, the first transaction identifier included in the request is selected and, at step 535, the logged trace data entries corresponding to the selected transaction identifier are retrieved. At step 540, the retrieved logged trace data entries are stored in results data store 545. A decision is made as to whether there are more transaction identifiers in the request that corresponding to additional logged trace data entries that are to be returned to the requestor (decision 550). If there are additional transaction identifiers included in the request, then decision 550 branches to the "yes" branch which loops back to select the next transaction identifier in the request and select and find the logged trace data entries corresponding to the newly selected transaction identifier as described above. This looping continues until there are no more transaction identifiers to select, at which point decision 550 branches to the "no" branch whereupon, at step 550, the search results (results data store 545) are returned to the requestor. In one embodiment, the entire log for each node is returned to the requestor rather than sifting through the logged trace data entries and selecting those corresponding to one or more given transaction identifiers. Node processing of the log request thereafter ends at 558.

Returning to processing performed by the requestor node, at step 560, the logged trace data entries are received from the node. At step 565, the received logged trace data entries are saved (appended to) transaction based log 350. In addition, when entries are added to the transaction based log, each entry is associated (e.g., tagged, etc.) with a node identifier that identifies the node that provided the particular logged trace data entries. A decision is made as to whether there are more nodes in the cluster (decision 570). If there are more nodes in the cluster, then decision 570 branches to the "yes" branch which loops back to select the next node in the cluster, send the log request to the newly selected node, receive the logged trace data entries from the newly selected node, and add the logged trace data entries received from the newly selected node to transaction based log 350 along with associating the entries with the node identifier corresponding to the newly selected node. This looping continues until all of the nodes in the cluster have been processed, at which point decision 570 branches to the "no" branch whereupon, at step 575, the logged trace data entries are organized based on the transaction identifier(s), timestamps, node identifier, and the like, according to the desires of the user (e.g., using a GUI control to make organizational selections, etc.). At step 580, the organized data is displayed to the user (e.g., using display device 590 that displays a GUI of the organized data, etc.). Processing performed by the requesting node thereafter ends at 595.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method comprising:
   tracing a software program on a complex computing environment that includes a plurality of nodes, wherein the tracing comprises:
      sending a trace request from a requestor node to a selected plurality of nodes, wherein the requestor node and the selected plurality of nodes are included in the plurality of nodes, wherein the trace request is associated with the software program, and wherein the trace request is associated with a transaction identifier, and wherein the trace request includes one or more identifiers corresponding to one or more identified functions included in the software program;
      setting a trace breakpoint at each of the identified functions at each of the selected plurality of nodes, wherein the setting further comprises associating each trace breakpoint with the transaction identifier;
      executing the software program on the selected plurality of nodes;
      logging, at a memory included in each of the selected plurality of nodes, a plurality of trace data entries resulting from the execution of the software program on the respective nodes, wherein each of the trace data entries is associated with the transaction identifier;
      sending a log request from the requestor node to the selected plurality of nodes, wherein the log request is sent subsequent to the sending of the trace request;
      receiving, at the requestor node, the logged trace data entries from each of the selected plurality of nodes;
      storing, at the requestor node, a transaction-based log that includes the logged trace data entries received from each of the selected plurality of nodes and the transaction identifier corresponding to each of the logged trace data entries; and providing the transaction-based log to a user of the requestor node.

2. The method of claim 1 wherein the transaction identifier is a unique identifier and wherein the trace request further includes one or more identified processes included in the software program, and wherein the setting further comprises:
setting a trace breakpoint at each identified function within each identified process at each of the selected plurality of nodes.

3. The method of claim 2 further comprising:
identifying one or more data elements to be logged, wherein the identification of data elements is included in the trace request, and wherein the logging performed by the selected plurality of nodes includes trace data entries pertaining to the identified data elements.

4. The method of claim 1 wherein the sending of the trace request is performed after execution of the software program has commenced.

5. The method of claim 1 wherein each of the logged trace data entries includes a timestamp, wherein the method further comprises:
synchronizing a system clock included in each of the selected plurality of nodes to a common current time; and
associating a node identifier with each of the selected plurality of nodes, wherein the transaction based log includes the node identifiers that correspond with the received logged trace data entries.

6. The method of claim 1 further comprising:
receiving one or more element selections selected from a plurality of organizational data elements, wherein the plurality of organizational data elements include a transaction identifier element, a timestamp element, and a node element; and
organizing the transaction-based log based upon the received element selections, wherein the organized transaction-based log is provided to the user of the requestor node.

7. The method of claim 1 wherein the selected plurality of nodes includes the requestor node and wherein the program is executing simultaneously on at least two of the plurality of nodes.

8. An information handling system comprising:
a plurality of nodes interconnected with a plurality of communication interfaces between the nodes, wherein each node comprises:
one or more processors;
a memory coupled to at least one of the processors;
a software program that is stored in the memory and executed by at least one of the processors of the respective nodes;
a transaction-based tracing program that includes a set of computer program instructions stored in the memory and executed by at least one of the processors in order to perform actions of:
receiving a trace request from a requestor node, wherein the requestor node is included in the plurality of nodes, wherein the trace request is associated with the software program, and wherein the trace request is associated with a transaction identifier, and wherein the trace request includes one or more identifiers corresponding to one or more identified functions included in the software program;
setting a trace breakpoint at each of the identified functions, wherein the setting further comprises associating each trace breakpoint with the transaction identifier;
logging, in the node's memory, a plurality of trace data entries resulting from the execution of the software program on the nodes, wherein each of the trace data entries is associated with the transaction identifier;
receiving a log request from the requestor node, wherein the log request is sent subsequent to the sending of the trace request; and
sending the logged trace data entries associated with the transaction identifier to the requestor node, wherein the logged trace data entries received from each of the plurality of nodes are stored at the requestor node in a transaction-based log that includes the logged trace data entries received from each of the selected plurality of nodes and the transaction identifier corresponding to each of the logged trace data entries.

9. The information handling system of claim 8 wherein the transaction identifier is a unique identifier and wherein the trace request further includes one or more identified processes included in the software program, and wherein the setting comprises at least one of the processors performing additional actions comprising:
setting a trace breakpoint at each identified function within each identified process.

10. The information handling system of claim 9 wherein at least one of the processors perform additional actions comprising:
identifying one or more data elements to be logged, wherein the identification of data elements is included in the trace request, and wherein the logging performed by the plurality of nodes includes trace data entries pertaining to the identified data elements.

11. The information handling system of claim 8 wherein the sending of the trace request is performed after execution of the software program has commenced on one or more of the nodes.

12. The information handling system of claim 8 wherein each of the logged trace data entries includes a timestamp, and wherein at least one of the processors perform additional actions comprising:
synchronizing a system clock included in each of the plurality of nodes to a common current time; and
associating a node identifier with each of the plurality of nodes, wherein the transaction based log includes the node identifiers that correspond with the received logged trace data entries.

13. The information handling system of claim 8 wherein at least one of the processors perform additional actions comprising:
receiving one or more element selections selected from a plurality of organizational data elements, wherein the plurality of organizational data elements include a transaction identifier element, a timestamp element, and a node element; and
organizing the transaction-based log based upon the received element selections, wherein the organized transaction-based log is provided to a user of the requestor node.

14. A computer program product stored in a computer readable storage medium, comprising computer program code that, when executed by an information handling system, causes the information handling system to perform actions comprising:
tracing a software program on a complex computing environment that includes a plurality of nodes, wherein the tracing comprises:

sending a trace request from a requestor node to a selected plurality of nodes, wherein the requestor node and the selected plurality of nodes are included in the plurality of nodes, wherein the trace request is associated with the software program, and wherein the trace request is associated with a transaction identifier, and wherein the trace request includes one or more identifiers corresponding to one or more identified functions included in the software program;

setting a trace breakpoint at each of the identified functions at each of the selected plurality of nodes, wherein the setting further comprises associating each trace breakpoint with the transaction identifier;

executing the software program on the selected plurality of nodes;

logging, at a memory included in each of the selected plurality of nodes, a plurality of trace data entries resulting from the execution of the software program on the respective nodes, wherein each of the trace data entries is associated with the transaction identifier;

sending a log request from the requestor node to the selected plurality of nodes, wherein the log request is sent subsequent to the sending of the trace request;

receiving, at the requestor node, the logged trace data entries from each of the selected plurality of nodes;

storing, at the requestor node, a transaction-based log that includes the logged trace data entries received from each of the selected plurality of nodes and the transaction identifier corresponding to each of the logged trace data entries; and providing the transaction-based log to a user of the requestor node.

15. The computer program product of claim 14 wherein the transaction identifier is a unique identifier and wherein the trace request further includes one or more identified processes included in the software program, and wherein the setting further comprises additional computer program code that, when executed by the information handling system, causes the information handling system to perform additional actions comprising:

setting a trace breakpoint at each identified function within each identified process at each of the selected plurality of nodes.

16. The computer program product of claim 15 further comprising additional computer program code that, when executed by the information handling system, causes the information handling system to perform additional actions comprising:

identifying one or more data elements to be logged, wherein the identification of data elements is included in the trace request, and wherein the logging performed by the selected plurality of nodes includes trace data entries pertaining to the identified data elements.

17. The computer program product of claim 14 wherein the sending of the trace request is performed after execution of the software program has commenced.

18. The computer program product of claim 14 wherein each of the logged trace data entries includes a timestamp, and wherein the computer program product further comprises additional computer program code that, when executed by the information handling system, causes the information handling system to perform additional actions comprising:

synchronizing a system clock included in each of the selected plurality of nodes to a common current time; and associating a node identifier with each of the selected plurality of nodes, wherein the transaction based log includes the node identifiers that correspond with the received logged trace data entries.

19. The computer program product of claim 14 further comprising additional computer program code that, when executed by the information handling system, causes the information handling system to perform additional actions comprising:

receiving one or more element selections selected from a plurality of organizational data elements, wherein the plurality of organizational data elements include a transaction identifier element, a timestamp element, and a node element; and organizing the transaction-based log based upon the received element selections, wherein the organized transaction-based log is provided to the user of the requestor node and wherein the program is executing simultaneously on at least two of the plurality of nodes.

20. The computer program product of claim 14 wherein the selected plurality of nodes includes the requestor node.

* * * * *